July 21, 1959 R. C. MOORE 2,896,078

AMPLITUDE MEASURING CIRCUIT

Filed April 29, 1953

2 Sheets-Sheet 1

INVENTOR.
ROBERT C. MOORE

BY

Allen V. Hazeltine
ATTORNEY

July 21, 1959 R. C. MOORE 2,896,078

AMPLITUDE MEASURING CIRCUIT

Filed April 29, 1953

2 Sheets-Sheet 2

INVENTOR.
ROBERT C. MOORE
BY
[signature]
ATTORNEY 2,896,078
Patented July 21, 1959

2,896,078

AMPLITUDE MEASURING CIRCUIT

Robert C. Moore, Erdenheim, Pa., assignor to Philco Corporation, Philadelphia, Pa., a corporation of Pennsylvania Application April 29, 1953, Serial No. 351,770
3 Claims. (Cl. 250—27)

Figure 1:
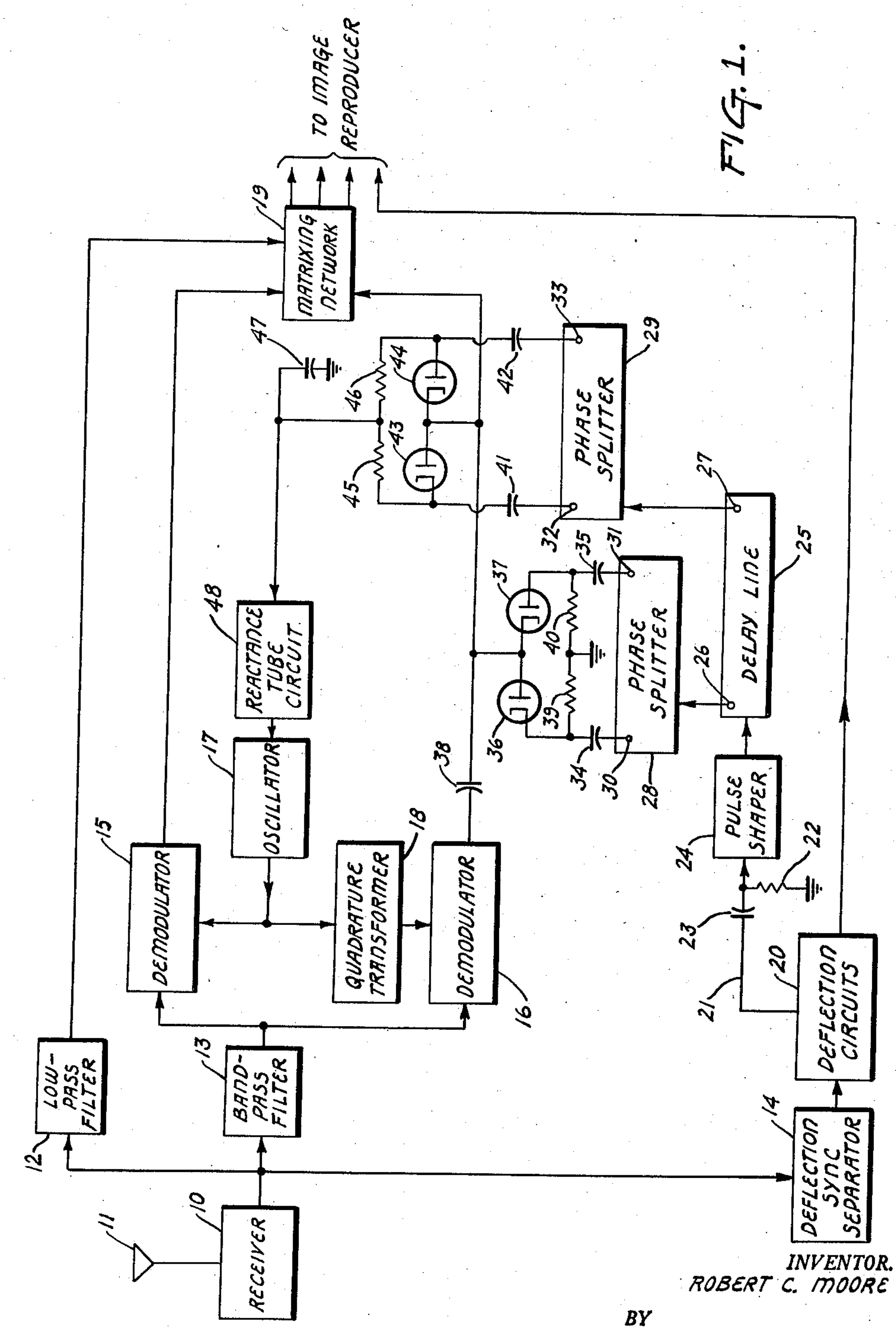

The invention relates to signal amplitude measuring circuits and, more particularly, to circuits for measuring the relative amplitudes of portions of a single signal which occur during different time intervals.

The need for measuring the relative amplitudes of such different signal portions arises frequently and in a wide variety of situations. For example, in certain color television receivers it is desired to demodulate a received carrier wave, which bears picture intelligence in the form of amplitude and phase variations, by heterodyning the carrier wave with a locally generated oscillation. Such a receiver must be provided with a phase synchronizing signal for its local oscillator. This synchronizing signal normally takes the form of a short burst, i.e. a few cycles, of a carrier wave having the same nominal frequency as the modulated carrier wave. The phase of this synchronizing signal is not subject to variations in accordance with picture intelligence so that it can serve as a phase reference signal for the modulated carrier wave. One such burst is usually incorporated into the transmitted signal during each scanning retrace interval by superposing the same upon the trailing portion, or back porch, of each horizontal blanking pulse. The leading portion of each blanking pulse, of course, continues to be occupied by a horizontal line synchronizing pulse in entirely conventional manner. Since the picture intelligence representative carrier wave and the phase synchronizing bursts are both at higher frequencies (e.g. 3 to 4 megacycles) than other components of the composite signal of which they form a part, they can be readily separated from those other components by means of a frequency-sensitive filter which is constructed in conventional manner to transmit signals in the aforementioned high frequency range, while rejecting signals in lower frequency ranges. This separation of high and low frequency components prior to demodulation of the former is desirable because it eliminates the problems which arise when it is attempted to transmit the low frequency component without distortion through one or more demodulators.

In any event, irrespective of what the reason for this separation of components may be, the separated high frequency component has the form of a carrier wave whose amplitude and phase vary in accordance with chromaticity intelligence during each line scanning interval, whose amplitude is zero during each of those intervals which are occupied, in the composite signal, by a horizontal line synchronizing pulse, and whose amplitude and phase are fixed during each synchronizing burst interval. This separated component is supplied simultaneously to a pair of conventional synchronous demodulators where it is heterodyned with continuous, locally generated waves of the same nominal frequency as the carrier wave and having phases which are controlled, in a manner hereinafter explained, so as to bear fixed relationships to each other and also to the phase of the synchronizing bursts. The output of each demodulator will then be a low frequency, or video signal whose amplitude varies in proportion to the relative phase variations of the received and locally generated waves applied thereto.

It is clear that, during the synchronizing burst intervals, the amplitude of the video signal produced by either demodulator will be indicative of the phase relation between the synchronizing burst wave and the locally generated wave which is supplied to the same demodulator. Variations which occur in the amplitude of the video signal during these intervals then represent relative phase variations of these waves. In particular, if the locally generated signal is in phase quadrature with the color burst signal, then no pulse at all will be produced by the demodulator during the color burst interval. If the phase of the locally generated signal advances for any reason, relative to that of the color burst, a pulse of a certain polarity will be produced by the demodulation while, if the phase of the locally generated signal is retarded, a pulse of the opposite polarity is produced. In either case, the amplitude of the pulse will be indicative of the degree of departure of the signals involved from quadrature phase relationship. Although it would appear that the pulses so produced by either demodulator may be used to control the phase of the locally generated waves so as to reestablish the desired fixed phase relation between each of them and the color reference bursts, serious obstacles are encountered when this is actually attempted.

To appreciate the seriousness of these obstacles, it should first be recalled that the pulses which result from the heterodyning of the color bursts with each locally generated wave are not the only signals produced in each demodulator. Rather the picture intelligence representative wave also produces demodulator output variations in each case and these latter occur, under most conditions of televised scene coloration, at frequencies occupying the same range as most frequency components of the pulses which are indicative of local oscillator phasing. In addition, these picture representative variations may be of either polarity relative to the amplitude reference level of the video signal, which latter is produced, as has been explained, during the horizontal synchronizing pulse intervals. Finally, the aforementioned reference level itself is subject to fluctuations with respect to any given fixed potential value because the demodulated signals are either produced without a D.-C. component by the inherent operation of the demodulators, or they are produced at excessively high D.-C. levels which must be deliberately suppressed before the demodulated signals are suitable for further processing. When, for either of the foregoing reasons, the D.-C. component is lacking, then the entire demodulator output signal will tend to center itself about some fixed potential value and its amplitude, during reference intervals, will depart from this fixed value by variable amounts determined by the fluctuations of the picture representative signal portions.

From the foregoing it is seen that those portions of either demodulator output signal which are suitable for local oscillator phase control are not distinguishable from other portions of that signal by their frequency, by their amplitude, or by their polarity. In addition, the reference portion of the signal—with relation to which the amplitude of the oscillator control signal must be measured—is itself subject to unpredictable changes in amplitude. In view of all this, it is clearly no routine matter to carry out the desired amplitude measurement.

It is, accordingly, a primary object of the invention to provide a circuit for measuring the relative amplitudes of different portions of a signal.

It is another object of the invention to provide a circuit for measuring the relative amplitudes of different portions of a signal when neither of these amplitudes is fixed.

It is still another object of the invention to measure the relative amplitudes of two different signal portions when the amplitude of a third portion of the same signal is subject to bi-directional departures from the amplitude of one of the portions whose relative amplitudes it is desired to measure.

It is a further object of the invention to provide a circuit for measuring the amplitude and polarity of bi-directional departures from a reference value of intermittently occurring signal portions, when the said reference value itself is subject to independently determined fluctuations.

The foregoing objects, as well as others which will appear, are accomplished by supplying the entire signal (including the portions whose relative amplitudes are to be measured) without its D.-C. component to a first circuit which is operative, during a first interval during which the signal would have reference amplitude were it not for its lack of a D.-C. component, to establish the signal at a predetermined potential, and thence to a second circuit which is operative, during a second interval during which the amplitude departure from reference is to be meaured, to measure the departure of the signal amplitude from the aforementioned predetermined potential.

Generally speaking, the foregoing is accomplished by supplying the signal whose relative amplitudes are to be measured to a first energy storage device, e.g. a first capacitor, which should also be effective to remove whatever D.-C. component the signal may possess at this stage. Means are provided for connecting this storage device to a source of the desired predetermined potential, these means being bi-directionally conductive and having sufficiently low impedance, at least during the said first (reference) interval, so that the storage device will assume the said potential before the end of that interval, irrespective of what its signal determined potential may have been. In addition, means are provided for connecting this first storage device to a second energy storage device, e.g. a second capacitor, these latter means being also bi-directionally conductive and having sufficiently low impedance, but only during the said second (phasing) interval, to charge the second storage device to the potential which the first storage device has during this second interval. It will be understood that the aforementioned "charging" of the second storage device may actually involve a transfer of charge either into or out of this storage device depending upon whether its potential is less than or greater than that of the said first storage device.

During time intervals other than the said second interval the impedance of the device which connects the first and second storage devices is made extremely high so as to inhibit energy interchange therebetween.

Figure 2:
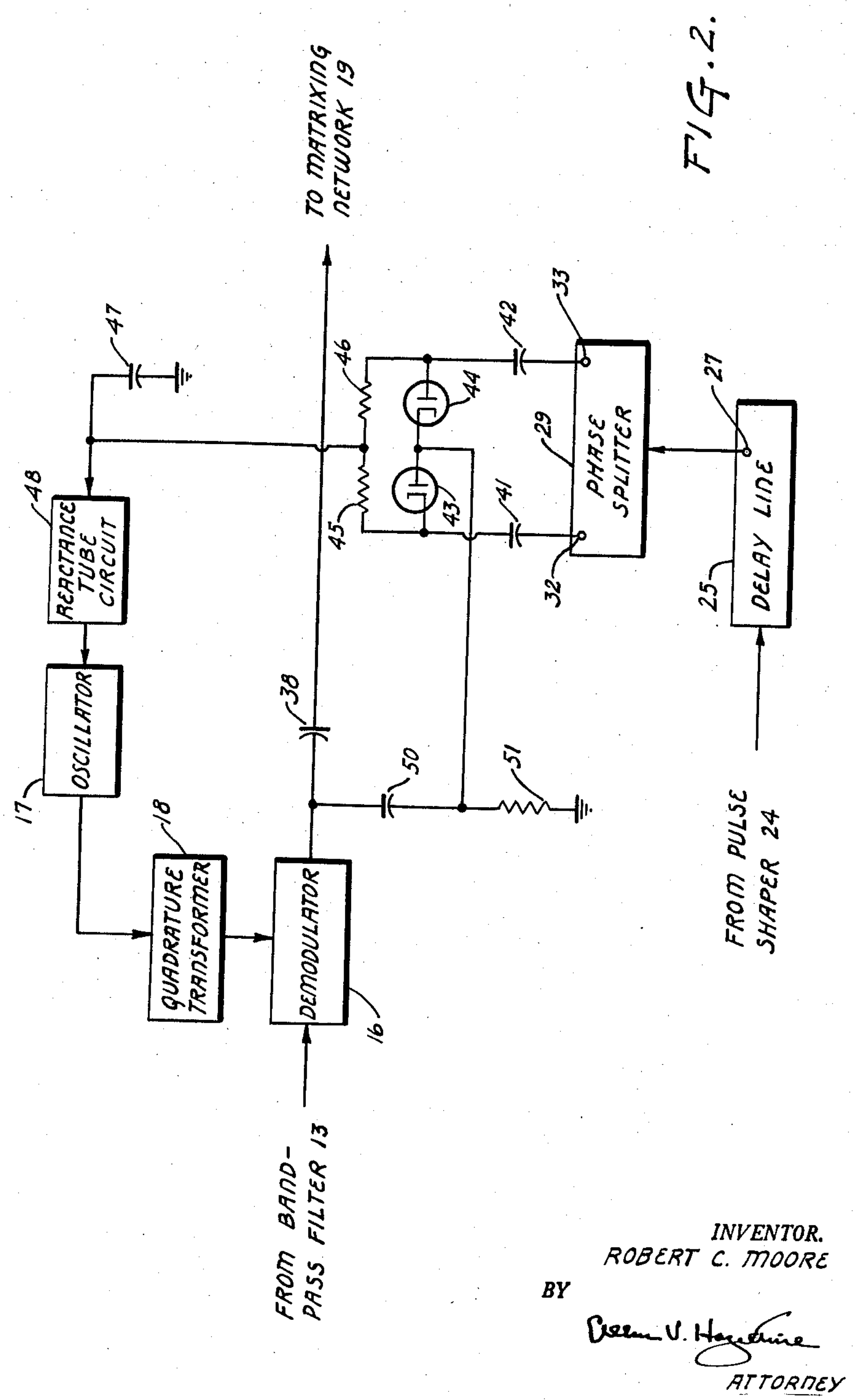

A more detailed description of various embodiments of my invention will now be given with reference to the accompanying drawings wherein:

Figure 1 is a circuit diagram of a preferred embodiment of the invention as applied to an otherwise known form of color television receiver; and Figure 2 is a circuit diagram of a simplified embodiment of the invention.

In Figure 1 of the drawings, to which more particular reference may now be had, there is diagrammatically illustrated a color television receiver 10, adapted to be supplied with signals intercepted by antenna 11 and including all those components of such a receiver which conventionally precede its lowest frequency, or video stages. These conventional components will normally include a radio frequency amplifier, a converter, an intermediate frequency amplifier and a video detector. By reason of the conventional operation of these components there appears at the output terminals of receiver 10 the received color television signal including its monochrome component, which typically occupies the 0 to 3 megacycle frequency range; its chromaticity component, which may consist of an amplitude and phase modulated carrier wave of 3.5 megacycle nominal frequency and occupying the 3 to 4 megacycle frequency range; and also the conventional blanking and synchronizing pulses which are common to both black-and-white and color television signals. The signal produced by color television receiver 10 also includes the aforedescribed color synchronizing bursts, one of which appears on the back porch of each horizontal blanking pulse. This composite signal is now supplied simultaneously to a low-pass filter 12, to a bandpass filter 13 and to a deflection sync separator 14. The low-pass filter 12 is conventionally constructed to transmit only signals in the 0 to 3 megacycle frequency range, to the substantial exclusion of signals at all other frequencies. Accordingly, this low-pass filter operates to separate the monochrome component of the received video signal from its chromaticity component and to transmit the former, while rejecting the latter. The bandpass filter 13, on the other hand, is conventionally constructed to transmit only signals in the 3 to 4 megacycle frequency range, while rejecting signals of all other frequencies. As a result of this construction, bandpass filter 13 will transmit the chromaticity component of the received video signal while rejecting the monochrome component. By the operation of low-pass filter 12 and bandpass filter 13, the monochrome and chromaticity signals will thus be separated into different channels. After separation in bandpass filter 13, the chromaticity component is supplied to one input circuit of each of two demodulators 15 and 16, the other input circuit of each of these demodulators being supplied with the output signal from a conventional sine wave oscillator 17. One of the demodulators, namely demodulator 15, may be supplied with this output signal directly, while the other demodulator, namely demodulator 16, may be supplied with the same output signal after passage through a conventional quadrature transformer 18. For reasons which will appear hereinafter, the local oscillator 17 is preferably constructed in such manner that it will normally produce an output signal which has the same, or the opposite phase as the color synchronizing bursts. Since this signal is supplied to demodulator 16 through quadrature transformer 18 it will reach the latter in quadrature phase relation with these color synchronizing bursts.

The output circuit of each of the demodulators 15 and 16 is then connected to a matrixing network 19, to which there is also connected the output circuit of low-pass filter 12. This matrixing network may be of any conventional form suitable for combining the monochrome component from filter 12 with the complementary chromaticity components from demodulators 15 and 16 in such proportions as to form output signals representative of different primary color components of the televised scene. A variety of circuits are known for carrying out the necessary combinations, the exact form to be used being dependent upon the exact form of the signals supplied thereto and also upon the nature of the image reproducing device. In any event, my invention is not concerned with the operation of the matrixing network, and it is therefore unnecessary to describe its construction in detail. Accordingly, for illustrative purposes only, there are shown in Figure 1 three separate output circuits for the matrixing network 19 from which there may be derived three separate output signals which are respectively representative of three different primary color components of the televised scene and which may thereafter be supplied in conventional manner to any kind of image reproducer (not shown) which is adapted to produce a colored image of this televised scene in response to such supplied signals.

The deflection sync separator 14 may also be of any conventional construction which enables it to separate the horizontal line synchronizing pulses from the remaining portions of the signal produced by color television receiver 10. For example, this deflection sync separator may comprise a triode which is biased so far negatively as to be rendered conductive only upon the application of signals whose amplitude exceeds the blanking pulse level. If used alone, such a triode would also transmit the color synchronizing bursts. To prevent this, its output is further connected to a conventionally constructed filter circuit which is transmissive only of frequencies equal to the rate of recurrence of horizontal line synchronizing pulses or at most to a few harmonics of this same rate, and which is particularly non-transmissive of signals of the color burst frequency (i.e. 3.5 megacycles). The horizontal line synchronizing pulses, which are thus produced by deflection sync separator 14, are supplied to conventional cathode ray tube deflection circuits productive of signals which can be supplied to the one or more cathode ray tubes constituting the image reproducer of this receiver system to control the electron beam scanning thereof. The synchronizing pulses supplied to these deflection circuits control, in conventional manner, the rate of occurrence and duration of the horizontal line scans.

In accordance with present day standards, the electron beam of a cathode ray tube used in television image reproduction returns from the point at which one of its horizontal line scans ends to the point from which the next scan begins in an interval which is very much shorter than the interval during which it scans forwardly across the tube. This rapid return, or flyback, is executed in response to an extremely rapid variation in the signal which is produced in the deflection circuits for controlling beam deflection. This extremely rapid variation is called the flyback pulse and is, by reason of its abrupt nature, readily distinguishable from other portions of the deflection control signal which vary considerably more slowly. In accordance with present standards, this flyback pulse occurs during the blanking interval and is, in particular, initiated before the end of the horizontal line synchronizing pulse. Consequently there is produced, in the conventional deflection circuits associated with any form of cathode ray tube image reproducer which adheres to present standards of receiver operation, a pulse-like signal which is initiated before the end of the horizontal line synchronizing pulse and consequently also before the beginning of the color synchronizing burst which follows each horizontal line synchronizing pulse upon the pedestal provided by the blanking pulse, as has been previously explained. The connection 21, shown in Figure 1, is made to these deflection circuits 20 at a point at which a signal proportional to the flyback pulses may be derived from the deflection circuits. This derived signal is supplied through connection 21 to a differentiating network which consists of resistor 22 and capacitor 23 and which is responsive to the supplied pulse signal to produce a spike signal of one polarity at the beginning of the flyback pulse and a spike signal of the opposite polarity at its termination. These spike signals, produced by the operation of the differentiating network, are then supplied to a pulse shaping network 24 which is conventionally constructed to produce a substantially rectangular pulse of predetermined polarity in response only to spike signals of one particular polarity supplied thereto. In practice such a pulse shaping network may consist of a one shot multivibrator. This pulse shaper is constructed so that it will respond only to spike signals of the same polarity as the spike signals which are produced at the beginning of the horizontal flyback pulse. The pulse shaping network is further constructed so that the substantially rectangular pulse which it delivers will terminate before the beginning of the interval during which the color synchronizing burst occurs. This pulse signal, produced by pulse shaping network 24, is then supplied to the input terminal of a delay line 25. This delay line has two output terminals 26 and 27. From the former, the pulse which is supplied to the delay line may be derived substantially instantaneously. From the latter, on the other hand, the same pulse may be derived somewhat later—namely, during the time interval during which the next color synchronizing burst is present in the composite signal. This will involve delaying the pulse supplied to the delay line by approximately the duration of the horizontal line synchronizing pulse, or about five microseconds. Delay lines which are adapted for this purpose are, of course, well known, and any conventional form thereof may be utilized here. Instead of using the horizontal flyback pulse in the manner hereinbefore described to generate the pulses put out by delay line 25, it is, of course also possible to use the horizontal line synchronizing pulse itself for the same purpose.

In either case, as a consequence of the operation of the foregoing elements, there will be available at the terminal 26 of delay line 25 a rectangular pulse during each horizontal line synchronizing interval while, at terminal 27, there will be available a similar rectangular pulse during each color synchronizing burst interval. The pulse signal produced at terminal 26 is then supplied to a phase splitter 28, while the pulse signal produced at terminal 27 is supplied to a second phase splitter 29. Each of these phase splitters is conventionally constructed to produce, at its two output terminals, signals of the same form as the signal which is applied to its input but having mutually opposite phases. This may be accomplished, for example, by utilizing, for each of the phase splitters 28 and 29, a triode vacuum tube to whose control grid electrode the input signal is supplied. A cathode load resistor and an anode load resistor are then provided for each of these vacuum tubes. A signal similar in form to the one supplied at its control grid electrode, and having the same phase as the supplied signal, can then be derived from the cathode of the triode, while a signal of the same form but of opposite phase or polarity can be derived from its anode. Consequently, at the output terminals 30 and 31 of phase splitter 28, there will be available pulse signals of mutually opposite polarity during each horizontal line synchronizing interval, while at the output terminals 32 and 33 of phase splitter 29 there will be available pulse signals of mutually opposite polarity during each color synchronizing burst interval.

The output terminals 30 and 31 of phase splitter 28 are respectively connected, through capacitors 34 and 35, to the cathode of a diode 36 and to the anode of a different diode 37, the remaining electrodes of these diodes 36 and 37 being connected together and being further connected to the output of demodulator 16 by way of D.-C. blocking capacitor 38. To the cathode of diode 36 there is further connected one terminal of a resistor 39, while to the anode of diode 37 there is further connected one terminal of a second resistor 40. The other terminals of these resistors 39 and 40 are connected together and also to some point of fixed potential, such as ground. The output terminals 32 and 33 of phase splitter 29 are respectively connected through series capacitors 41 and 42 to the cathode of a diode 43 and to the anode of another diode 44, the remaining electrodes of these diodes being connected together and also to the output of demodulator 16 through the aforementioned capacitor 38. Two resistors 45 and 46 are serially connected between the cathode of diode 43 and the anode of diode 44 but, unlike the resistors which are connected to diodes 36 and 37, the resistors 45 and 46, which are connected to diodes 43 and 44, are connected to ground through a capacitor 47. The junction of these resistors 45 and 46 is also connected to the input circuit of a conventional reactance tube circuit 48 whose output circuit is in turn connected to the oscillator 17 in the conventional manner so as to control the frequency and phase of the oscillations produced by the latter.

The connection of each of the four diodes 36, 37, 43 and 44 to its respective phase splitter output terminal is made in such a way that each diode receives, from its particular phase splitter output terminal, a pulse of such polarity as to tend to render this diode conductive. Thus, for example, the diode 36 which is connected to phase splitter output terminal 30, is supplied therethrough with a pulse of negative polarity, while the diode 37 is supplied from output terminal 31 with a positive pulse; similarly, diode 43 receives a negative pulse from phase splitter output terminal 32, while diode 44 receives a positive pulse from output terminal 33. As has been explained, the pulses which are supplied to phase splitter 28 from the delay line output terminal 26, and in response to which diodes 36 and 37 are rendered conductive, occur during the time intervals occupied by the horizontal line synchronizing pulses in the composite signal. During these same time intervals, the output signal of demodulator 16, having passed through capacitor 38, will have an amplitude which is neither representative of picture intelligence nor of reference value. That portion of the circuit which is associated with diodes 36 and 37 then operates upon this demodulator output signal so as to establish the signal at a fixed potential during the interval in question. Since diodes 36 and 37 are connected to the path which the signal follows after it passes through the capacitor 38 with different electrodes, and since both diodes are rendered conductive simultaneously, they will both offer very low impedance to the flow of current between the capacitor 38 and ground, diode 36 permitting current flow in one direction, while diode 37 permits current flow in the other direction. If, at the beginning of the conductive interval, the capacitor 38 is at a negative potential with respect to ground, then electrons will flow out of it and through the diode 37 to ground. If, on the other hand, the same capacitor is at a positive potential, then electrons derived from the ground connection will flow into it through diode 36. The values of resistors 39 and 40 are so chosen, relative to the value of capacitor 38, that the charge on capacitor 38 will be completely neutralized during the conductive interval and the capacitor will finally reach ground potential. At the end of the interval in question, the potential on that plate of capacitor 38 which is connected to the diodes will therefore be zero, and a reference level which is independent of picture intelligence will have been established for the entire signal transmitted by capacitor 38. At all other times, and particularly during the intervals when the demodulator output signal is representative of oscillator phasing intelligence, the diodes 36 and 37 are non-conductive and offer extremely high impedance to the flow of currents to the ground connection between resistors 39 and 40. Consequently, potential variations which are produced by demodulator 16 during these other times are readily transmitted to the matrixing network 19.

The pulse which is produced at the delay line output terminal 27, and the pulses of opposite polarities which are produced in response thereto at output terminals 32 and 33 of phase splitter 29 for supply to diodes 43 and 44, occur, as has been previously explained, during the time interval immediately following the occurrence of a horizontal line synchronizing pulse in the composite signal or, in other words, during the color synchronizing burst interval. As has also been explained, the output signal of demodulator 16 is representative, during that same interval, of departures from the desired phase relationship between the color synchronizing burst and the local oscillator signal. In particular, because the output signal from demodulator 16 had been established at ground potential by the action of diodes 36 and 37 during the immediately preceding horizontal line synchronizing interval, and because the oscillator signal and color synchronizing burst are preferably supplied to the demodulator in phase quadrature, the demodulator output signal which is transmitted by capacitor 38 will also be at ground potential during the color synchronizing burst interval if the oscillator is properly phased, and will have an amplitude which departs from ground potential by an amount proportional to the aforementioned phase departure, and a polarity which is indicative of the sense of the phase departure from its desired relationship. If the oscillator is normally so adjusted that the signal which it produces is supplied to the demodulator in any phase other than quadrature relative to the phase of the color synchronizing burst, then the demodulator output signal will be different from zero even when the oscillator is properly phased. However, this departure from zero potential will be fixed for any particular situation and amplitude variations due to oscillator misphasing will then be represented by bi-directional signal amplitude departures from this fixed potential.

When diodes 43 and 44 are simultaneously rendered conductive during the color burst interval, they serve to supply charge to or remove charge from capacitor 47 depending upon whether the amplitude of the signal which appears at capacitor 38 exceeds the potential on capacitor 47 or is less than that potential. During all other time intervals, i.e. when the diodes 43 and 44 are non-conductive, the potential which is established across capacitor 47 during their conduction intervals will be substantially maintained, subject only to minor losses due to capacitor leakage resistance and due to the resistance in the discharge path which may be provided for this capacitor within the reactance tube circuit 48. The average potential which is established in this manner across capacitor 47 thus constitutes a measure of the amplitude which the demodulator output signals has during color synchronizing burst intervals relative to the amplitude which the same demodulator output signal has during horizontal line synchronizing pulse intervals. As has been explained, this same potential is also indicative of the degree of misphasing of the local oscillator with respect to the received color synchronizing burst and is therefore suitable for application to reactance tube circuit 48 to control the reactance of the latter and also the phasing of the oscillator 17 in conventional manner.

It will be apparent that the operation of the charging circuit for capacitor 47, as outlined above, does not interfere with the transmission of the picture intelligence representative portions of the demodulation output signal from the demodulator 16 to the matrixing network 19. Rather, by the cooperative action of the circuit which includes diodes 36 and 37, and of the second circuit which includes diodes 43 and 44, the desired measurement of relative signal amplitudes at known time-spaced intervals is effected despite the bi-directional character of the relative amplitude variations, despite the fact that the amplitude of the signal during the particular intervals at which it is desired to measure the same may be less than the amplitude of the same signal during still other time intervals, and despite the fact that there is initially no portion of fixed reference amplitude in the signal. In addition, the output signal from demodulator 16 has its D.-C. component restored by the inherent operation of diodes 36 and 37, but this restoration takes place at an appropriately low level. In the particular case illustrated in Figure 1, the D.-C. restoration is carried out relative to ground potential. This is often desirable for the best operation of the matrixing network 19. However, if the particular matrixing network 19 to which this demodulator output signal is supplied, is designed for operation with signals having no D.-C. component, then this D.-C. component may, of course, be removed again by connecting another capacitor in series with the path which the signal from demodulator 16 follows, this connection being made at a point intermediate the input to the matrixing network 19 and the connections of all the diodes to this signal path.

If it is desired to establish the signal reference value at a potential which differs from ground, then it is only necessary to disconnect the junction of resistors 39 and 40 from ground and to connect this junction to a source of the particular potential at which it is desired to establish the reference portions of the signal.

When it is not important to restore the D.-C. component of the demodulator output signal before application to the matrixing network, or when it is desired to effect such restoration by other means, then an embodiment of the invention may be used to perform the desired measurement of relative amplitudes which is considerably simpler than that shown in the embodiment of Figure 1. One form of such a simplified circuit is shown in the embodiment of Figure 2 of the drawings, to which more particular reference may now be had. Many of the components of this modified embodiment of the invention are identical to those of the embodiment of Figure 1. These identical components have therefore been designated by the same reference numerals in both figures. Furthermore, in order to avoid unnecessary repetition, only those elements common to both embodiments which are intimately associated with the modified portion of the entire receiver system of Figure 1 have been reproduced in Figure 2. Of course, the connections between the components which are actually illustrated in Figure 2 and those which have been omitted have also been indicated.

Thus there is shown in Figure 2 of the drawings a demodulator 16 which corresponds in all respects to the demodulator bearing the same reference numeral in Figure 1. This demodulator is supplied with a signal from a bandpass filter 13, as in the system of Figure 1. The output of this demodulator 16 is again connected to a capacitor 38, signals traversing this capacitor 38 being then supplied to a matrixing network 19 like that of Figure 1. The demodulator 16 is also supplied with a second input signal from oscillator 17 by way of quadrature transformer 18, the oscillator 17 being, in turn, adapted to have its phase controlled by a reactance tube circuit 48, which latter includes a capacitor 47 in its reactance determining circuit. As in the embodiment of Figure 1, the capacitor 47 is connected not only to the reactance tube circuit 48 but also to the junction between two resistors 45 and 46, which latter are further connected in series across the series combination of a pair of diodes 43 and 44. Again, as in the embodiment of Figure 1, those electrodes of diodes 43 and 44 which are connected to resistors 45 and 46 are also connected, through separate coupling capacitors 41 and 42, to the output terminals 32 and 33 respectively of a phase splitter 29. A pulse signal from a pulse shaper, like that designated by reference numeral 24 in Figure 1, is supplied to phase splitter 29 from one output terminal 27 of a delay line 25.

Thus far, the circuit of Figure 2 differs from that of Figure 1 only in one respect, namely in that the junction of diodes 43 and 44 is not connected to the lead which connects capacitor 38 to the matrixing network to which the output signal from demodulator 16 is supplied. Instead, this junction of diodes 43 and 44 is connected to the junction between a capacitor 50 and a resistor 51, the other terminal of resistor 51 being grounded, while the other terminal of capacitor 50 is connected to a point in the output circuit of demodulator 16 intermediate that demodulator and capacitor 38. In this particular embodiment of the invention, the combination of resistor 51 and capacitor 50 and the connection between this R-C circuit and diodes 43, 44 replaces the entire circuit associated with diodes 36 and 37 in Figure 1 of the drawings. To this end, the relative values of capacitor 50 and resistor 51 are so chosen that the potential developed on the resistor-connected plate of capacitor 50 is discharged to ground during an interval which is no greater than the horizontal line synchronizing pulse interval. Since the amplitude of the demodulator output signal is not subject to variation during any given one of these horizontal line synchronizing pulse intervals, the junction of resistor 51 and capacitor 50 will, by the foregoing discharging action, have become established to ground potential at the end of any such horizontal line synchronizing pulse interval. Since this junction is directly connected to the junction of diodes 43 and 44, the latter will also be established at this potential at the end of each horizontal line synchronizing interval and therefore also at the beginning of the next subsequent color synchronizing burst interval. During this latter interval, when the demodulator 16 produces an output signal in the form of a pulse whose amplitude and polarity depends upon the degree of departure from phase quadrature between the signal produced by oscillator 17 and the color reference burst, capacitor 50 and resistor 51 will cooperate to differentiate this pulse signal into a spike signal of one polarity occurring at the beginning of the demodulator output pulse and into a spike signal of the opposite polarity occurring at the end of the pulse. Each one of these spike signals will have an amplitude and a polarity which is indicative of the amplitude and polarity of the pulse from which they are derived. These spike signals are applied in succession to the junction of diodes 43 and 44 through capacitor 50. There are further supplied to these diodes, which are normally kept non-conductive, gating pulses from output terminals 32 and 33, respectively, of phase splitter 29, each of these gating pulses being timed so as to coincide with the occurrence of a particular one of the two spike signals resulting from the differentiation of the pulse output signal of demodulator 16. These diodes will then again operate to charge or discharge, as may be necessary, the capacitor 47 until the potential developed thereacross is proportional to the amplitude (measured relative to ground potential) of the particular spike signal during whose occurrence the diodes are gated on. The occurence of the other spike signal will have no effect on the potential of capacitor 47 since diodes 43 and 44 will be non-conductive when it occurs. Accordingly, there is again developed across capacitor 47 an average potential whose value depends upon the amplitude of, and whose polarity depends upon the polarity of the pulses produced by demodulator 16 during the intervals of interest. This average potential is then again utilized in conventional manner to control the reactance of reactance tube circuit 48, which in turn governs the phase with which oscillator 17 produces its output signal in the desired fashion. It will be seen that the principal modification of the portions of the circuit of Figure 1 common to both embodiments which is necessary in order to enable them to cooperate successfully with the distinctive portions of the circuit of Figure 2 resides in the readjustment of pulse shaper 24 to produce the shorter pulses which are needed to discriminate between the successive spike signals supplied to diodes 43 and 44. However, it will be understood that, in the embodiment of Figure 1, the pulses used to gate on the diodes 43 and 44 need not necessarily be of the same duration as the color synchronizing burst interval either. On the contrary, even in the embodiment of Figure 1, the pulse signals supplied either to phase splitter 29 or to phase splitter 28, or to both may be so short as to gate the diodes on only at the beginning or at the end of each burst interval.

While it is preferable, in each of the foregoing embodiments, to establish the output signal at, or substantially at the reference potential before the end of each horizontal synchronizing interval, it will be understood that this is essential only if the departures of the signal level from reference, owing to the lack of a D.-C. component, occur so rapidly as to assume significant proportions between successive synchronizing intervals. Should these variations occur more slowly, then it suffices, of course, that the signal be established at the reference value within a period of these variations.

Similar reason also applies to the establishment of the capacitor 47 at a potential, relative to the reference potential, which is determined by the phase indicative demodulator output variations. If these variations are normally of appreciable extent during the interval between successive color bursts, then the charging circuit should be responsive within each color burst interval to charge the capacitor to its full desired potential. If not, then the charging rate may be decreased, preferably by increasing the impedance of the charging path, so that the capacitor is charged to the desired potential well within a period of the anticipated variations.

It will be understood that the invention is susceptible of still other emobdiments without departing from my teachings. Accordingly, I desire the scope of my invention to be limited only by the appended claims.

I claim:

1. In combination: a signal source means for producing a signal having an amplitude which is substantially constant during each of a plurality of periodically recurrent first intervals, but which is subject to change from one of said intervals to the next, each of said first intervals being followed by a second interval during which the amplitude of said signal is susbtantially constant but subject to departure from its amplitude during the preceding one of said first intervals, and means for developing a potential whose magnitude represents the magitude of said departure and whose polarity represents the sense of said departure, said means comprising a series resistance-capacitance network consisting of a capacitive element and a substantially reactance free resistive element, said capacitive element being connected between said signal source and the junction of said elements and said resistive element being connected between a first point of fixed potential and said junction, said network having a time-constant, at least during each of said first intervals, such as to establish said junction at said fixed potential within the duration of any one of said first intervals, a capacitor having one plate connected to a second point of fixed potential, and normally non-conductive means operative during each of said second intervals to conduct unidirectional current in either direction between the other plate of said capacitor and said junction of said resistance-capacitance network.

2. The combination of claim 1 further characterized in that said means for conducting unidirectional current comprises a pair of oppositely poled, normally non-conducting diodes conductively connected in parallel between said other capacitor plate and said network junction, and means for rendering both of said diodes simultaneously conductive during each of said second intervals.

3. The combination of claim 1 further characterized in that said resistive element of said resistance-capacitance network comprises a pair of oppositely poled, normally non-conducting diodes conductively connected in parallel between said capacitive element and said first point of fixed potential, and means for rendering both said diodes simultaneously conductive during each one of said first intervals.

References Cited in the file of this patent

UNITED STATES PATENTS

| | | |
|---|---|---|
| 2,441,246 | Miller | May 11, 1948 |
| 2,564,017 | Maggio | Aug. 14, 1951 |
| 2,571,017 | Dempsey et al. | Oct. 9, 1951 |
| 2,597,214 | Woodbury | May 20, 1952 |
| 2,666,136 | Carpenter | Jan. 12, 1954 |
| 2,683,803 | Keizer | July 13, 1954 |
| 2,761,010 | Bridges | Aug. 28, 1956 |
| 2,766,321 | Parker | Oct. 9, 1956 |
| 2,781,489 | Petrides | Feb. 12, 1957 |
| 2,802,899 | Sonnenfeldt | Aug. 13, 1957 |